United States Patent [19]

Iwasaki et al.

[11] Patent Number: 4,724,714
[45] Date of Patent: Feb. 16, 1988

[54] RACK-AND-PINION STEERING GEAR DEVICE

[75] Inventors: Akira Iwasaki; Takeomi Miyoshi, both of Saitama, Japan

[73] Assignee: Honda Giken Kogyo Kabushiki Kaisha, Tokyo, Japan

[21] Appl. No.: 922,735

[22] Filed: Oct. 24, 1986

[30] Foreign Application Priority Data

Oct. 28, 1985 [JP] Japan ............................ 60-165425[U]
Oct. 29, 1985 [JP] Japan ................................ 60-242192

[51] Int. Cl.$^4$ .................... B62D 3/12; F16H 55/18; F16H 35/06
[52] U.S. Cl. .................................. 74/396; 74/422; 74/440; 74/498
[58] Field of Search ................ 74/396, 422, 440, 498; 180/148

[56] References Cited

U.S. PATENT DOCUMENTS

| 1,167,873 | 1/1916 | Appleman | 74/440 X |
| 1,619,799 | 3/1927 | Rounds et al. | 74/440 |
| 1,815,450 | 7/1931 | Schmal | 74/396 X |
| 3,753,375 | 8/1973 | Colletti | 74/396 X |
| 4,614,127 | 9/1986 | Elser | 74/396 X |
| 4,630,496 | 12/1986 | Yasuoka | 74/440 X |
| 4,640,147 | 2/1987 | Yasukawa et al. | 74/440 X |

FOREIGN PATENT DOCUMENTS

| 38311 | 1/1928 | Denmark | 74/440 |
| 1094120 | 12/1960 | Fed. Rep. of Germany | 74/498 |
| 43-30333 | 12/1943 | Japan . | |
| 45-23041 | 8/1970 | Japan . | |

Primary Examiner—Allan D. Herrmann
Attorney, Agent, or Firm—Irving M. Weiner; Joseph P. Carrier; Pamela S. Burt

[57] ABSTRACT

A rack-and-pinion steering gear device has a mechanism for adjusting backlash and eliminating lost motion or play between a rack and a pinion. The pinion is formed on a pinion shaft angularly movably supported by a pinion holder, the pinion shaft having an axis out of alignment with the central axis of the pinion holder. The pinion holder is angularly movably supported in a housing such that the relative positions of these components with respect to each other are adjustable. A subpinion is supported on the pinion shaft for angular movement with respect to the pinion, the pinion and the subpinion being held in mesh with the rack. The subpinion is normally urged by a resilient member in a direction to turn with respect to the pinion. By adjustably turning the pinion holder with respect to the housing, the backlash between the rack and the pinion is adjusted and the lost motion or play between the rack and the pinion is eliminated by the subpinion.

9 Claims, 7 Drawing Figures

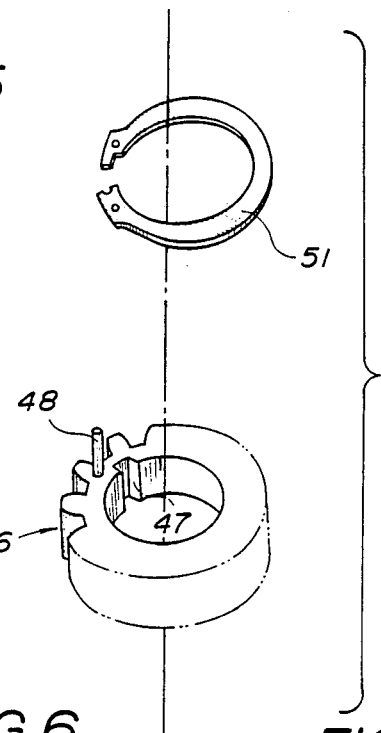
FIG.5
FIG.6
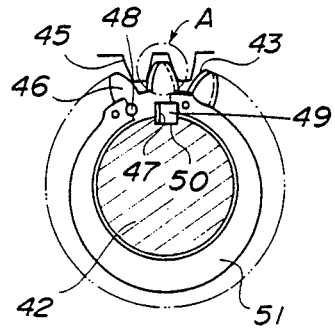
FIG.7
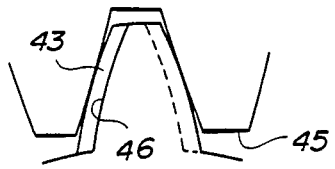

RACK-AND-PINION STEERING GEAR DEVICE

BACKGROUND OF THE INVENTION

1. Field of the Invention

The present invention relates to a rack-and-pinion steering gear device.

2. Description of the Relevant Art

Rack-and-pinion steering gear devices are well known in the art. One major concern about steering gears of this type has been to make efforts to adjust the backlash between the rack and the pinion or to eliminate lost motion or play therebetween. For example, Japanese Patent Publication No. 45(1980)-23041 discloses a coil spring used to urge a rack shaft resiliently against a pinion shaft. Another attempt disclosed in Japanese Patent Publication No. 43(1978)-30333 employs an adjustment screw for adjusting the resiliency of a coil spring which resiliently urges the rack shaft, and a pinion holder by which the pinion shaft is angularly movably supported and which is angularly movable with respect to a housing around an axis normal to the pinion shaft.

In the aforesaid conventional proposals, the rack shaft is resiliently biased against the pinion shaft to adjust the backlash and eliminate the lost motion. Since, however, the rack shaft is relatively heavy, the device used to resiliently urge the rack shaft is required to be relatively large. Furthermore, it has been difficult to eliminate the lost motion or clearance without impairing smooth meshing engagement between the rack and the pinion.

SUMMARY OF THE INVENTION

It is a first object of the present invention to provide a rack-and-pinion steering gear device including a pinion holder which is interposed between a gear box and a pinion shaft and which is utilized for simple backlash adjustment.

A second object of the present invention is to provide a rack-and-pinion steering gear device having a simple arrangement on a pinion shaft for eliminating lost motion or play.

To accomplish the above objects, a pinion shaft is angularly movably supported by a pinion holder with the axis of the pinion shaft being out of alignment with the central axis of the pinion holder. Further, the pinion holder is angularly movably supported in a housing such that the relative positions of these components with respect to each other are adjustable.

A subpinion and a pinion are held in mesh with a rack, and the subpinion is disposed coaxially with the pinion shaft and angularly movable with respect to the pinion. The subpinion is normally urged by a resilient member in a direction to turn with respect to the pinion.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 5 is a perspective view of a subpinion and a resilient member;

FIG. 6 is a cross-sectional view taken along line VI—VI of FIG. 4; and

FIG. 7 is an enlarged fragmentary view of a portion indicated at A in FIG. 6.

DETAILED DESCRIPTION OF THE PREFERRED EMBODIMENTS

Figure 1:
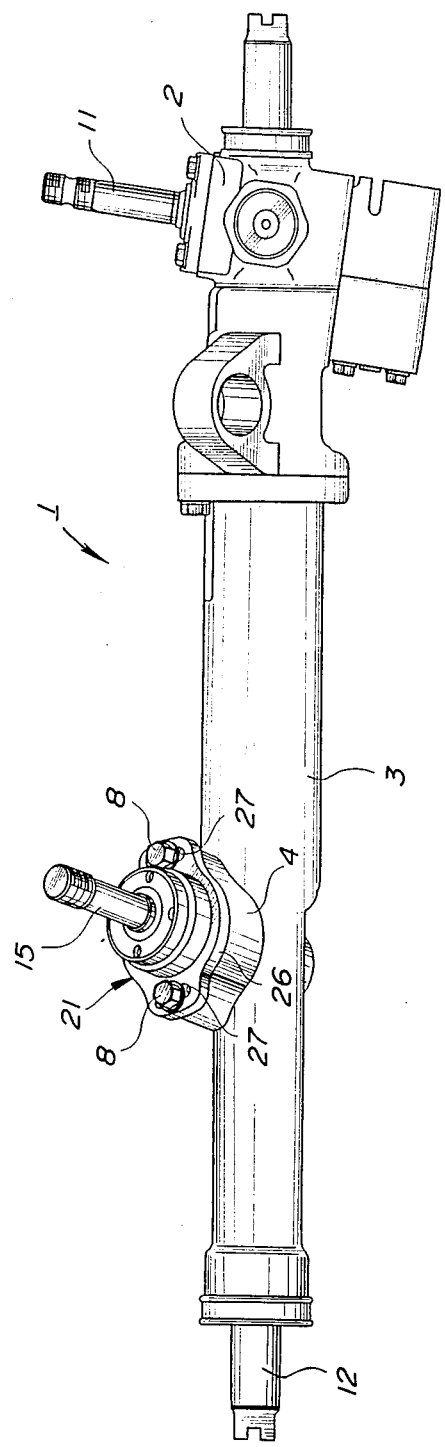
FIG. 1 is a perspective view of a steering gear device according to an embodiment of the present invention.

FIG. 1 shows a front steering gear device as viewed from behind and below a motor vehicle on which it is installed. The steering gear device has a housing 1 including a pinion housing 2 supporting a pinion shaft 11 to which the rotation of a steering wheel (not shown) is transmitted. The housing 1 also includes a cylindrical rack housing 3 in which a rack shaft 12 is longitudinally disposed. The rack housing 3 includes another pinion housing 4 projecting from an intermediate portion thereof in a rearward direction of the motor vehicle. The pinion housing 4 supports a rotation output pinion shaft 15. Rotation of the pinion shaft 15 is transmitted through a linkage shaft (not shown) to a rear steering gear device (not shown).

Figures 2, 3:
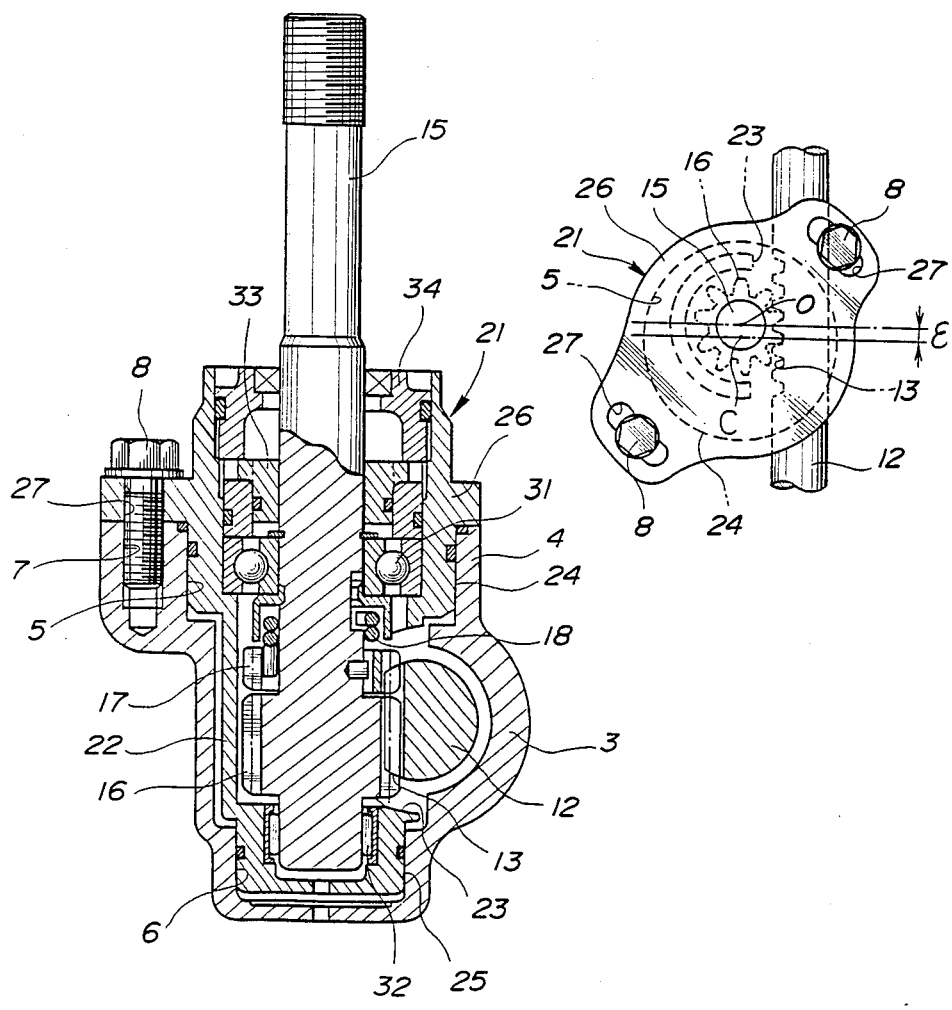
FIG. 2 is a cross-sectional view of parts in a housing of the steering, gear device shown in FIG. 1.
FIG. 3 is a plan view of the arrangement shown in FIG. 2.

As shown in FIG. 2, the pinion shaft 15 is mounted by a pinion holder 21 in the pinion housing 4. The pinion holder 21 includes a cylindrical portion 22 having a flange 26 formed on an upper larger-diameter portion 24 thereof and a window recess 23 defined in a lower smaller-diameter portion 25 thereof. The larger- and smaller-diameter portions 24, 25 are being concentric with each other. The rack shaft 12 has a rack 13 disposed in the window recess 23. As illustrated in FIG. 3, the pinion shaft 15 is angularly movably supported in the cylindrical portion 22 and has a central axis O which is displaced ϵ out of coaxial alignment with the central axis C of the larger- and smaller-diameter portions 24, 25. The flange 26 has a pair of slots 27 spaced from each other in diametrically opposite relation and extending in the circumferential direction of the flange 26.

The pinion housing 4 has a circular hole 5 defined in its open end and in which the larger-diameter portion 24 of the pinion holder 21 is fitted, and another circular hole 6 defined in its bottom and in which the smaller-diameter portion 25 of the pinion holder 21 is fitted. The pinion housing 4 also has a pair of threaded holes 7 defined in its end surface lying around the circular hole 5 and spaced from each other in diametrically opposite relation.

The pinion shaft 15 has a pinion 16 formed around its lower portion. A subpinion 17 is angularly movably mounted on or loosely fitted over the pinion shaft 15 directly above (FIG. 2) the pinion 16. The pinion 16 and the subpinion 17 have the same number of teeth, but the pinion 16 has a wider face width than that of the subpinion 17. The subpinion 17 is normally urged by a tortion coil spring 18 in a direction to turn with respect to the pinion 16. The coil spring 18 is disposed around the pinion shaft 15 and acts between the pinion shaft 15 and the subpinion 17.

The pinion shaft 15 is rotatably mounted in the cylindrical portion 22 of the pinion holder 21 by means of a ball bearing 31, a needle bearing 32, and a seal 33. The pinion shaft 15 is axially retained in position by a cap 34 fitted in the outer open end of the larger-diameter portion 24. The pinion 16 and the subpinion 17 on the pinion shaft 15 have teeth disposed in the window recess 23.

For assembly, the larger- and smaller-diameter portions 24, 25 with the pinion shaft 15 disposed therein are inserted into the circular holes 5, 6, respectively, of the pinion housing 4, with the pinion holder 21 being angularly movable within the pinion housing 4 around the central axis C parallel to the pinion shaft 15. The pinion 16 and the subpinion 17 are held in mesh with the rack 13 of the rack shaft 12. Bolts 8 are loosely threaded through the slots 27 of the flange 26 into the threaded holes 7 of the pinion housing 4.

Then, the pinion holder 21 is adjustably turned with respect to the pinion housing 4 to adjust backlash of the pinion 16 with respect to the rack 13. Thereafter, the bolts 8 are firmly tightened into the threaded holes 7 to fasten the pinion holder 21 to the pinion housing 4.

Since the pinion shaft 15 is displaced out of coaxial relation to the pinion holder 21 by the distance $\epsilon$ and the bolts 8 are inserted through the slots 27 of the pinion holder 21, the backlash between the rack 13 and the pinion 16 can be adjusted or eliminated simply by turning the pinion holder 21 with respect to the pinion housing 4 to move the pinion shaft 15 by a small interval with respect to the rack shaft 12.

While the backlash adjustment mechanism is shown as being interposed between the pinion shaft 15 and the rack shaft 12, it may be disposed between the input pinion shaft 11 and the rack shaft 12, and may also be incorporated in the rear steering gear device. The principles of the present invention are applicable to all steering gear devices of the rack-and-pinion type.

FIGS. 4 through 7 illustrate a steering gear device according to another embodiment of the present invention.

Figure 4:
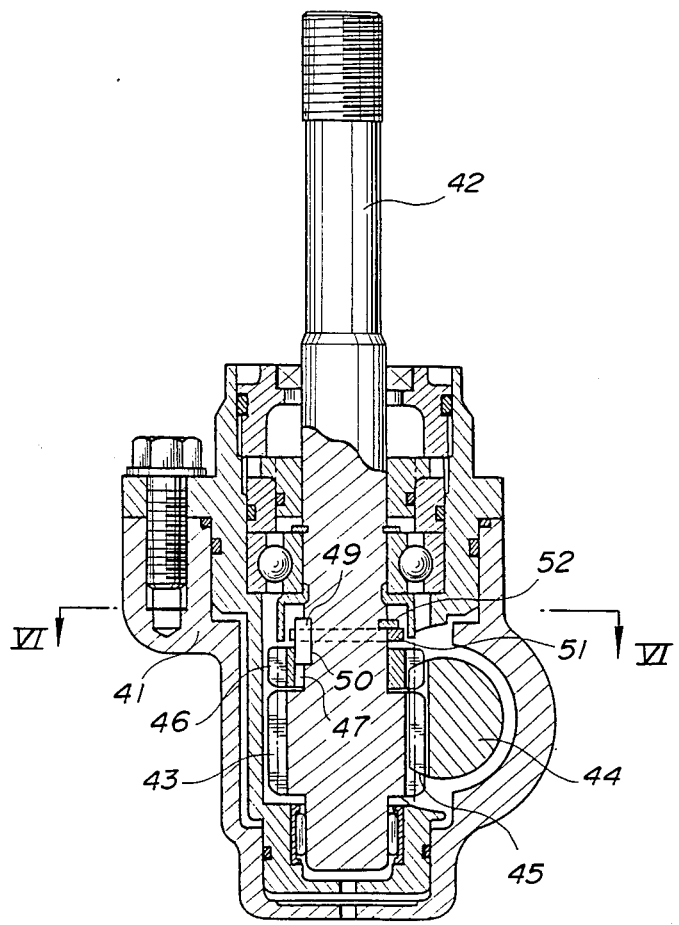
FIG. 4 is a cross-sectional view of parts in a housing of a steering gear device according to another embodiment of the present invention.

As shown in FIG. 4, the steering gear device includes a housing 41, a pinion shaft 42, and a rack shaft 44. The pinion shaft 42 and the rack shaft 44 are mounted in the housing 41. A pinion 43 on a lower portion of the pinion shaft 42 is held in mesh with a rack 45 of the rack shaft 44 at a portion thereof except an upper portion thereof.

A subpinion 46 is loosely fitted over the pinion shaft 42 above the pinion 43 adjacent thereto and held in mesh with the upper portion of the rack 45. The pinion 43 and the subpinion 46 have the same number of teeth.

As shown in FIG. 5, the subpinion 46 has an axial groove 47 defined in an inner peripheral surface. As shown in FIG. 6, a key 49 is fitted in a key slot 50 defined in an outer peripheral surface of the pinion shaft 42 and has a lower portion inserted in the groove 47 of the subpinion 46 and an upper portion projecting out of the groove 47. The groove 47 has a width slightly larger than the width of the key 49 so that the subpinion 46 is angularly movable by a small angle with respect to the pinion shaft 42.

A pin 48 projects axially from an upper surface (FIG. 5) of the subpinion 46 near the groove 47. With the subpinion 46 meshing with the rack 45, a substantially circular set spring 51 in the form of a flat spring is disposed around the pinion shaft 42 and has its opposite ends engaging the pin 48 and the key 49, as best shown in FIG. 6. The subpinion 46 is normally urged under the resiliency of the set spring 51 to turn with respect to the pinion 43 for angularly shifting the pinions 43, 46 with respect to each other, as illustrated in FIG. 7. The set spring 51 is retained in place on the pinion shaft 42 by a stopper ring 52, see FIG. 4.

The subpinion 46 is thus normally biased by the set spring 51 to eliminate any backlash or lost motion between the rack 45 and the pinion 43. Therefore, unwanted lost motion or play between the rack 45 and the pinion 43 is effectively eliminated without impairing smooth meshing engagement between the rack 45 and the pinion 43.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A rack-and-pinion steering gear device comprising:
a housing;
a pinion shaft supported by said housing and having a pinion;
a rack shaft supported in said housing and having a rack meshing with said pinion;
a subpinion supported on said pinion shaft for angular movement with respect to said pinion and held in mesh with said rack; and
a resilient member for normally urging said subpinion in a direction to move angularly;
said pinion being formed as an integral part of said pinion shaft and having a larger face width than that of said subpinion.

2. A rack-and-pinion steering gear device according to claim 1, wherein said resilient member comprises a coil spring disposed around said pinion shaft and acting between the pinion shaft and said subpinion.

3. A rack-and-pinion steering gear device according to claim 6, wherein said resilient member comprises a substantially circular flat spring disposed around said pinion shaft and acting between the pinion shaft and said subpinion.

4. A rack-and-pinion steering gear device according to claim 3, wherein:
said circular flat spring has opposite ends respectively engaging a pin projecting axially from an upper surface of said subpinion an a key fitted in a slot defined in an outer peripheral surface of said pinion shaft;
said subpinion having an axial groove defined in an inner peripheral surface thereof, said axial groove having a width slightly larger than the width of said key, and a lower end of said key being inserted in said axial groove.

5. A rack-and-pinion steering gear device comprising:
a housing;
a pinion shaft supported by said housing and having a pinion;
a rack shaft supported in said housing and having a rack meshing with said pinion;
a pinion holder mounted in said housing, said pinion shaft being angularly movable supported by said pinion holder;
a subpinion supported on said pinion shaft for angular movement with respect to said pinion and held in mesh with said rack; and a resilient member for normally urging said subpinion in a direction to move angularly;

said pinion shaft having an axis positioned out of alignment with a central axis of said pinion holder, said pinion holder being angularly movable about said central axis parallel to said pinion shaft an mounted in said housing for relative positional adjustment.

6. A rack-and-pinion steering gear device according to claim 5, wherein said pinion holder includes a flange having a plurality of slots, and is fastened to said housing by bolts extending through aid slots, respectively.

7. A rack-and-pinion steering gear device according to claim 5, wherein said resilient member comprises a coil spring disposed around said pinion shaft and acting between the pinion shaft and said subpinion.

8. A rack-and-pinion steering gear device according to claim 5, wherein aid resilient member comprises a substantially circular flat spring disposed around said pinion shaft and acting between the pinion shaft and said subpinion.

9. A rack-and-pinion steering gear device according to claim 8, wherein:

said circular flat spring has opposite ends respectively engaging a pin projecting axially from an upper surface of said subpinion and a key fitted in a slot defined in an outer periphral surface of said pinion shaft;

said subpinion having an axial groove defined in an inner peripheral surface thereof, said axial groove having a width slightly larger than the width of said key, and a lower end of said key being inserted in said axial groove.

* * * * *

UNITED STATES PATENT AND TRADEMARK OFFICE
CERTIFICATE OF CORRECTION

PATENT NO. : 4,724,714

DATED : February 16, 1988

INVENTOR(S) : Akira Iwasaki et al.

It is certified that error appears in the above-identified patent and that said Letters Patent is hereby corrected as shown below:

```
Column 2, line 35, delete "being"
Column 2, line 60, change "tortion to --torsion--
Column 4, line 40 (claim 3, line 2), after "claim" change "6"
to --1--
Column 4, line 48, (claim 4, line 5), change "an" to --and--
Column 4, line 64 (claim 5, line 8), change "movable" to
--movably--
Column 5, line 6 (claim 5, line 18), change "an" to --and--
Column 5, line 13 (claim 6, line 4), change "aid" to --said--,
```

Signed and Sealed this

Twelfth Day of July, 1988

Attest:

DONALD J. QUIGG

Attesting Officer

Commissioner of Patents and Trademarks